Dec. 4, 1951  R. S. LOVERIDGE  2,577,533
SPECTACLE TEMPLE MEASURING INSTRUMENT
Filed July 25, 1949
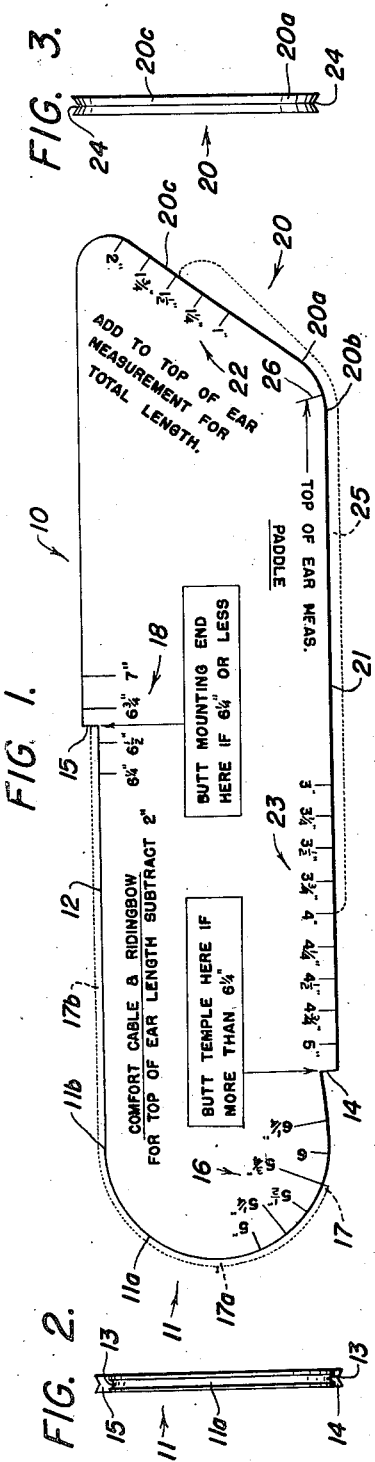
Inventor:
RALPH S. LOVERIDGE,
Attorneys.

Patented Dec. 4, 1951

2,577,533

UNITED STATES PATENT OFFICE 2,577,533

SPECTACLE TEMPLE MEASURING
INSTRUMENT

Ralph S. Loveridge, Salt Lake City, Utah

Application July 25, 1949, Serial No. 106,675

5 Claims. (Cl. 33—200)

This invention relates to measuring devices used by opticians to determine the lengths of spectacle temples.

Spectacle temples are difficult to measure, because they are not rectilinear throughout their lengths. Certain types, especially those made of metal or partially of metal, such as the comfort cable type or the riding bow type, include an extensively curved and relatively flexible ear-engaging portion, while other types, such as the heavier tortoise shell or plastic temples in common use, embody a relatively rigid ear-engaging portion whose curvature is quite different in character. Practically all types, however, present the problem of obtaining an accurate arcuate measurement in addition to a rectilinear measurement or measurements, while, between themselves, they present the further problem of obtaining accurate measurements of mutually different types of curvature.

Accordingly, a principal object of the invention is to provide a simple measuring device from which an accurate measurement reading of the total length of a spectacle temple, having a curved portion, may be taken quickly and easily.

An object is to provide such a device which is compact and convenient to use, capable of low cost production, and which may be employed for both the flexible and rigid types of temples mentioned hereinbefore.

A further object is to provide a measuring instrument capable of accurately measuring a spectacle temple having an elongate rectilinear portion and a curved comfort cable portion, regardless of the relative length proportions of the two.

In accomplishing these objects I utilize a preferably flat blade of suitable material, such as a plastic, whose working edges are channeled to receive temples to be measured. One end of the blade is provided with an extensively curved working edge, having a substantially semi-circular formation corresponding generally to the comfort cable portion of those types of spectacle temples which embody same, while the opposite end of the blade is of a different formation, being provided with an angularly arcuate working edge to accommodate the relatively inflexible ear-engaging portion of the aforestated other type of spectacle temple.

The problems involved in measuring these different types of temples are different, but the flat blade body affords a common structure for accomplishing the desired measurements quickly and conveniently. Such blade structure common to both measuring operations is susceptible of very low cost manufacture on a mass production basis, and its formation is such as to facilitate handling of the instrument for either of the measuring operations.

Both of the curved end portions of the blade structure merge into an elongate rectilinear portion, the latter being disposed along respectively opposite longitudinal edges of the blade.

With respect to the measurement of spectacle temples having a comfort cable portion, whose curvature is substantially semi-circular, the instrument is provided with spaced zero points of reference which are advantageously abutments in the form of raised shoulders shaped from the material of the blade itself. One of such shoulders marks the termination of the elongate rectilinear portion corresponding to the particular blade end concerned, while the other marks the termination of the curved ear-engaging portion. Sets of appropriate scale graduations representing the ultimate measurement readings to be obtained are marked or otherwise applied to one or both flat faces of the blade adjacent the respective abutments. Accordingly, if a temple having a relatively long comfort cable portion is to be measured, the free terminus of such portion is placed against the abutment marking the termination of the curved portion of the blade, while the measurement is read from the set of graduations adjacent the other abutment, it being understood that the temple is placed within the channel of the appropriate working edge of the instrument. On the other hand, if a temple having a relatively short comfort cable portion is to be measured, the free terminus of the elongate rectilinear portion is placed against the abutment marking the termination of the rectilinear working edge portion of the blade, while the measurement is read from the set of graduations adjacent the other abutment.

With respect to the measurement of the other type of spectacle temple which is relatively rigid, the instrument is preferably provided with a marked point of reference at the location of mergence of the angularly arcuate edge portion with a rectilinear edge portion, and is provided, further, with a set of scale graduations adjacent the far termination of the elongate rectilinear measuring portion, and with another set adjacent the far termination of the ear-piece measuring portion. A spectacle temple to be measured is placed in the edge channel of this part of the instrument, with its curvature mating generally with the curvature of the instrument. The total length measurement is the sum of the measurement readings on the said two sets of scale graduations.

Additional objects and features of the invention will be apparent from the following detailed description of the presently preferred specific embodiment illustrated in the accompanying drawing.

In the drawing:

Fig. 1 represents a plan view of the measuring instrument, showing one marked and scale-graduated flat face thereof, there being illustrated by broken lines two different types of spectacle temples in the process of measurement;

Fig. 2, an end elevation of the instrument per se, as viewed from the left in Fig. 1;

Fig. 3, an opposite end elevation, as viewed from the right in Fig. 1;

Fig. 4, a side elevation, as viewed from the top in Fig. 1;

Fig. 5, a side elevation, as viewed from the bottom in Fig. 2; and

Fig. 6, a view corresponding to that of Fig. 1, but fragmentary in character, and showing how a spectacle temple having a relatively long comfort cable portion is measured differently than the one indicated in Fig. 1, which has a relatively short comfort cable portion.

Referring to the drawing: the presently preferred embodiment illustrated is advantageously molded to proper configuration from one of the many types of plastic materials in common use, though, except for economy of manufacture, a variety of other materials, such as wood or metal, may be employed.

As illustrated, the measuring instrument is of flat blade formation, having uniform thickness throughout. The flat blade body 10 has one of its ends 11 rounded in what might be described as a substantially semi-circular curvature 11a, such curvature merging, at 11b, into an elongate rectilinear portion 12 which accommodates the elongate rectilinear portion of a spectacle temple. The extensively curved end 11 and elongate rectilinear portion 12 of the blade body 10 provide a working edge, which is channeled, as at 13, for the reception of a type of spectacle temple embodying a relatively flexible comfort cable portion serving as an ear piece.

The semi-circularly curved working edge portion 11a terminates at a raised shoulder 14, which provides an abutment means representing a zero point of reference for use in a measuring operation as hereinafter described. The elongate rectilinear working edge portion 12 terminates at a raised shoulder 15, which likewise provides an abutment means representing a zero point of reference for use in a measuring operation.

About the curvature 11a adjacent the shoulder 14 is a set of scale graduations 16 representing the distance in suitable linear units, such as inches, from the shoulder 15. Thus, the set of scale graduations 16 presents ultimate or final measurements from which may be read the total length of a spectacle temple, such as that indicated 17 in Fig. 1, the terminus of whose elongate rectilinear portion, that is to say whose butt mounting end, is placed against the shoulder 15.

In the instance of Fig. 1, the comfort cable portion or ear piece 17a of the spectacle temple 17 is relatively short in terms of ratio with respect to the rectilinear portion 17b. Often, however, such comfort cable portion is relatively long in terms of such ratio. In those instances, the terminus of the comfort cable portion or ear piece is placed against the other shoulder 14, and a second set of scale graduations 18, marked adjacent the shoulder 15, provides a reading of the total length of the spectacle temple. This is well illustrated in Fig. 6, where the spectacle temple is indicated at 19.

The sets of scale graduation 16 and 18 may appear on only one of the flat faces of the blade body 10, but they preferably appear on both.

The edge channel or groove 13 facilitates placement of the spectacle temple for measurement, and, as such, is a distinct advantage in the use of the instrument. It should be noted that the relatively flexible comfort cable portion of the spectacle temple may be flexed to substantially exact conformity with the curved end 11 of the blade 10.

The opposite end 20 of the blade body 10 is angularly arcuate in formation for the purpose of receiving for measurement a different type of spectacle temple. Its working curvature 20a is obtusely angular, and merges at 20b into the elongate rectilinear portion 21. The remainder 20c of the working edge of blade end 20 is rectilinear.

A set of scale graduations 22, representing ultimate or final measurement readings, is marked on one or both flat faces of the blade body adjacent the terminus of the rectilinear working edge portion 20c of the blade end 20, and another set of similar scale graduations 23 is marked adjacent the terminus of the elongate rectilinear working edge portion 21.

The spectacle temple of this type, which is usually formed of a relatively rigid tortoise shell or imitative plastic material relatively rigid in character, is placed in the channel or groove 24 (advantageously provided along the working edges of this end of the instrument) in substantially mating conformity with such working edges and the curvature 20a thereof, see Fig. 1, where the spectacle temple is indicated at 25. Thus, the lengths of the two rectilinear portions of the spectacle temple, including the curved portion thereof, may be read off on the respective scales 22 and 23. The sum of these two readings gives the total length of such spectacle temple.

It is desirable that a mark, such as the line 26, be placed at the point of mergence of the curvature 20a with the elongate rectilinear portion 21, so as to facilitate proper placement of the spectacle temple for measurement.

It should be noted that the flat blade body 10 serves effectively to provide for measurement of both types of spectacle temples, and, in so doing, furnishes a compact measuring instrument unitary in character and especially convenient to handle.

While this invention is here illustrated and described with respect to a presently preferred specific embodiment thereof, it should be understood that various changes may be made therein and various other embodiments may be constructed on the basis of the teachings hereof, by those skilled in the art, without departing from the protective scope of the following claims.

I claim:

1. A spectacle temple measuring instrument, comprising a substantially flat blade structure having an approximately semi-circularly curved edge portion merging into an elongate substantially rectilinear edge portion, the former portion to accommodate the comfort cable portion of a spectacle temple and the latter to accommodate the elongate rectilinear portion of said temple; an abutment means forming the free terminus of said curved blade-edge portion; an abutment means forming the free terminus of said elongate rectilinear blade-edge portion; a set of scale graduations marked on said blade structure adjacent the first-named abutment means, said graduations providing readings of edge distance from the second-named abutment means; and a set of scale graduations marked on said blade structure adjacent the second-named abutment means, said graduations providing readings of edge distance from the first-named abutment means.

2. The combination recited in claim 1, wherein the abutment means are raised shoulders formed in the edge margin of the blade structure.

3. The combination recited in claim 1, wherein the said edge portions of the blade structure are channeled for receiving spectacle temples to be measured.

4. A spectacle temple measuring instrument, comprising an elongate and substantially flat blade structure having substantially rectilinear longitudinal edge and an end edge which is approximately semi-circularly curved for receiving the comfort cable portion of a spectacle temple, said curved end edge merging into and forming a continuation of said longitudinal edge; a zero reference point on the blade structure at the said curved end edge thereof remote from the said longitudinal edge, adjacent said curved edge thereof for the free terminus of a comfort cable portion of a spectacle temple; a zero reference point on the blade structure at a location along said longitudinal edge thereof which is remote from said curved edge thereof for the free terminus of the elongate rectilinear portion of a spectacle temple; a set of scale graduations marked on the blade structure adjacent the first-named zero reference point, said graduations providing readings of edge distance from the second-named zero reference point; and a set of scale graduations marked on the blade structure adjacent the second-named zero reference point, said graduations providing readings of edge distance from the first-named zero reference point.

5. The combination recited in claim 4, wherein the working edge portions of the blade structure are channeled for receiving spectacle temples to be measured.

RALPH S. LOVERIDGE.

REFERENCES CITED

The following references are of record in the file of this patent:

UNITED STATES PATENTS

| Number | Name | Date |
| --- | --- | --- |
| 780,948 | Hales | Jan. 24, 1905 |
| 987,315 | Nero | Mar. 21, 1911 |
| 1,480,584 | Wilhite | Jan. 15, 1924 |

FOREIGN PATENTS

| Number | Country | Date |
| --- | --- | --- |
| 326,480 | Great Britain | Mar. 12, 1930 |